United States Patent
Allen et al.

(10) Patent No.: US 10,019,336 B2
(45) Date of Patent: Jul. 10, 2018

(54) NATURAL LANGUAGE BASED CAPTURING OF USER INTERFACE INTERACTIONS

(71) Applicant: INTERNATIONAL BUSINESS MACHINES CORPORATION, Armonk, NY (US)

(72) Inventors: Corville O. Allen, Morrisville, NC (US); Robert E. Loredo, North Miami Beach, FL (US); Adrian X. Rodriguez, Durham, NC (US); Eric M. Woods, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 14/835,916

(22) Filed: Aug. 26, 2015

(65) Prior Publication Data
US 2017/0060545 A1 Mar. 2, 2017

(51) Int. Cl.
*G06F 11/34* (2006.01)
*G06F 17/27* (2006.01)
*G06F 9/451* (2018.01)

(52) U.S. Cl.
CPC ........ *G06F 11/3438* (2013.01); *G06F 17/279* (2013.01); *G06F 9/453* (2018.02)

(58) Field of Classification Search
CPC ... G06F 11/3438; G06F 17/279; G06F 9/4446
See application file for complete search history.

(56) References Cited

U.S. PATENT DOCUMENTS

| | | | | |
|---|---|---|---|---|
| 7,139,978 | B2 * | 11/2006 | Rojewski | G06F 17/30899 707/E17.119 |
| 9,459,780 | B1 * | 10/2016 | Smith | G06F 11/34 |
| 9,697,197 | B1 * | 7/2017 | Birnbaum | G06F 17/2785 |
| 2007/0168922 | A1 | 7/2007 | Kaiser | |
| 2011/0010164 | A1 | 1/2011 | Williams | |
| 2011/0307863 | A1 * | 12/2011 | Malnati | H04L 41/0681 717/123 |
| 2013/0227350 | A1 * | 8/2013 | O'Riordan | G06F 11/3476 714/45 |

(Continued)

OTHER PUBLICATIONS

Lally et al., "Question analysis: How Watson reads a clue," 2012, http://brenocon.com/watson_special_issue/02%20question%20analysis.pdf.*

(Continued)

*Primary Examiner* — Ryan Barrett
(74) *Attorney, Agent, or Firm* — William H. Hartwell

(57) ABSTRACT

Software that uses natural language to describe user interactions with user interfaces and associates those natural language descriptions with goals that are achievable using the user interfaces. The software performs the following operations: (i) identifying a first set of action(s) performed by a first user using a user interface (UI), wherein each action of the first set of action(s) corresponds to a respective UI element; (ii) generating a set of natural language statement(s) corresponding to the identified first set of action(s); and (iii) associating one or more natural language statements of the set with a goal, wherein the goal is achievable by performing one or more of the actions of the first set of action(s) using their respectively corresponding UI elements.

18 Claims, 4 Drawing Sheets

---

500

GOAL A: "User logged in the device using quick login dialog (#gui-id 232945)"

ACTION 1: "The User tapped login (#gui-id 458945)"
  ACTION 2: "The User entered name in user name field (#gui-id 3934822)"
  ACTION 3: "The Password was auto filled by system in password field (gui-id 2343243)"
  ACTION 4: "The User clicks login (#gui-id 564540)"
  ACTION 5: "The user is failed to log in (#gui-id 394284)"
  ACTION 6: "the User deleted auto filled password in password field (#gui-id 2343243)"
  ACTION 7: "The User enters password in password field (#gui-id 2343243)"
  ACTION 8: "The User clicks login (#gui-id 5645400)"
  ACTION 9: "The user is logged in successfully (#gui-id 394284)"

GOAL B: "User checked friend invites"

ACTION 1: "The User clicks 'See Friend Invites' button (#gui-id 109932)"

(56) References Cited

U.S. PATENT DOCUMENTS

| | | | | |
|---|---|---|---|---|
| 2014/0019937 | A1* | 1/2014 | Clark | G06F 8/73 717/123 |
| 2014/0108019 | A1* | 4/2014 | Ehsani | G10L 21/06 704/275 |
| 2014/0359691 | A1 | 12/2014 | Woods et al. | |
| 2016/0188139 | A1* | 6/2016 | Pistoia | H04L 67/306 715/745 |
| 2016/0342317 | A1* | 11/2016 | Lim | G06F 3/04847 |
| 2016/0364993 | A1* | 12/2016 | Chetlur | G09B 5/06 |

OTHER PUBLICATIONS

Yates et al., "A Reliable Natural Language Interface to Household Appliances," Jan. 12-15, 2003, https://homes.cs.washington.edu/~weld/papers/p2308-yates.pdf.*

Kravitz, A.;"Coremetrics vs. Omniture vs. Google Analytics<<MIX Analytics"; Posted in Coremetrics, Google Analytics on Aug. 12, 2012; Updated: Feb. 26, 2013. <http://www.akravitz.com/coremetrics-vs-omniture-vs-google-analytics/>.

Madhavan, A.; "Semi Automated User Acceptance Testing using Natural Language Techniques"; 2014 Iowa State University Digital Repository @ Iowa State University. Graduate Theses and Dissertations, Paper 13937; Copyright © Arvind Madhavan, 2014; Ames, Iowa.

Plante, N.; "Natural Language Acceptance Testing with Cucumber | Dr. Dobb's"; Jun. 29, 2009; Copyright © 2015 UBM tech; <http://www.drdobbs.com/architecture-and-design/natural-language-acceptance-testing-with/228701081>.

Ramos, R. et al.; "Methods for capturing user intent"; Peer Assist, Project No. AAL-2009-2-137, Deliverable 3.1. <http://cnl.di.uoa.gr/peerassist/Deliverables/d_3_1_capturing_user_intent.pdf>.

"Cucumber" Simple, human collaboration; Copyright © Cucumber Ltd, 2014-2015; Printed on: Apr. 14, 2015; pp. 1-6; <https://cukes.info/>.

"FOAF Vocabulary Specification 0.99"; Namespace Document Jan. 14, 2014—Paddington Edition; pp. 1-42. <http://xmlns.com/foaf/spec>.

"Mobile App reports—Analytics Help"; Google; © 2015, Printed on: Apr. 14, 2015; <https://support.google.com/analytics/topic/2568641?hl=en&rd=1>.

"Mouseflow—Mouse Tracking, Website Heatmaps"; Mouseflow; © 2010-2015, Mouseflow ApS; Printed on: Apr. 14, 2015; pp. 1-3; <http://mouseflow.com/>.

"Piwik: Tracking User Interactions | PACKT Books"; Packt Publishing; Printed on: Apr. 14, 2015; pp. 1-11; <https://www.packtpub.com/books/content/piwik-tracking-user-interactions>.

"Selenium IDE Plugins"; SeleniumHQ; Printed on: Apr. 14, 2015; pp. 1-3; <http://docs.seleniumhq.org/projects/ide/>.

"Web event tracking with Javascript—Implementation | Opentracker Analytics"; Printed on: Apr. 14, 2015; pp. 1-11; <http://www.opentracker.net/docs/implementation/javascript>.

* cited by examiner

GOAL A: "User logged in the device using quick login dialog (#gui-id 232945)"

ACTION 1: "The User tapped login (#gui-id 458945)"
    ACTION 2: "The User entered name in user name field (#gui-id 3934822)"
    ACTION 3: "The Password was auto filled by system in password field (gui-id 2343243)"
    ACTION 4: "The User clicks login (#gui-id 564540)"
    ACTION 5: "The user is failed to log in (#gui-id 394284)"
    ACTION 6: "the User deleted auto filled password in password field (#gui-id 2343243)"
    ACTION 7: "The User enters password in password field (#gui-id 2343243)"
    ACTION 8: "The User clicks login (#gui-id 5645400)"
    ACTION 9: "The user is logged in successfully (#gui-id 394284)"

GOAL B: "User checked friend invites"

ACTION 1: "The User clicks 'See Friend Invites' button (#gui-id 109932)"

FIG. 5

1. User pressed phone's power button at 1:23:01 PM.
2. User typed '0' at 1:23:02 PM.
3. User typed '1' at 1:23:03 PM.
4. User typed '2' at 1:23:04 PM.
5. User typed '3' at 1:23:05 PM.
6. User swiped home screen page to the right at 1:23:06 PM from coordinates [23,48].
7. User opened 'Email' app at 1:23:07 PM.
8. User swiped down at 1:23:08 PM from coordinates [55,88]
9. User opened email item at index 0 at 1:23:09 PM.
10. User pressed 'back' at 1:23:10 PM.
11. User opened email item at index 1 at 1:23:11 PM.

FIG. 6

NATURAL LANGUAGE BASED CAPTURING OF USER INTERFACE INTERACTIONS

BACKGROUND

The present invention relates generally to the field of human-computer interactions, and more particularly to the capturing and recording of user interactions with computer systems.

In the field of human-computer interactions, user interface design involves designing hardware and software with a focus on the experience of the end user. Generally speaking, user interface design requires an understanding of user needs, which can be determined, for example, by monitoring a user's interactions with existing hardware and/or software.

SUMMARY

According to an aspect of the present invention, there is a method, computer program product and/or system that performs the following operations (not necessarily in the following order): (i) identifying a first set of action(s) performed by a first user using a user interface (UI), wherein each action of the first set of action(s) corresponds to a respective UI element; (ii) generating a set of natural language statement(s) corresponding to the identified first set of action(s); and (iii) associating one or more natural language statements of the set with a goal, wherein the goal is achievable by performing one or more of the actions of the first set of action(s) using their respectively corresponding UI elements.

BRIEF DESCRIPTION OF THE DRAWINGS

FIG. 5 is a diagram showing natural language statements generated by embodiments according to the present invention; and FIG. 6 is a diagram showing natural language statements generated by embodiments according to the present invention.

DETAILED DESCRIPTION

Figure 1:
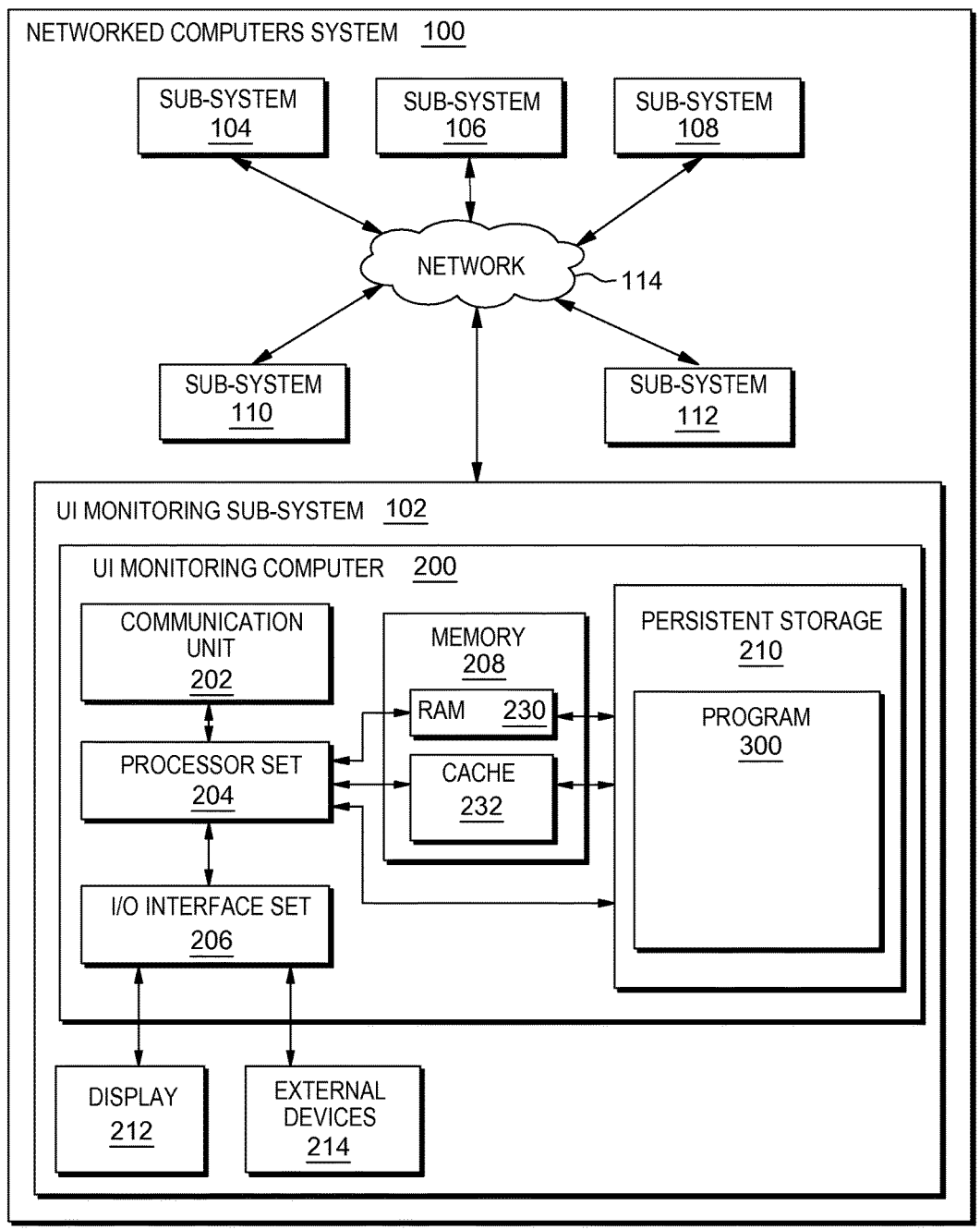
FIG. 1 is a block diagram view of a first embodiment of a system according to the present invention.

User interface design typically involves determining how a user will interact with a given user interface. Embodiments of the present invention can assist in user interface design by describing—in natural language—user interactions with user interfaces and associating those natural language descriptions with goals that are achievable using the user interfaces. By using natural language to describe these user interactions, some embodiments of the present invention can develop insights that can lead to improvements in the user interfaces and their corresponding user experiences. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: UI monitoring sub-system 102; sub-systems 104, 106, 108, 110, 112; communication network 114; UI monitoring computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with UI monitoring computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
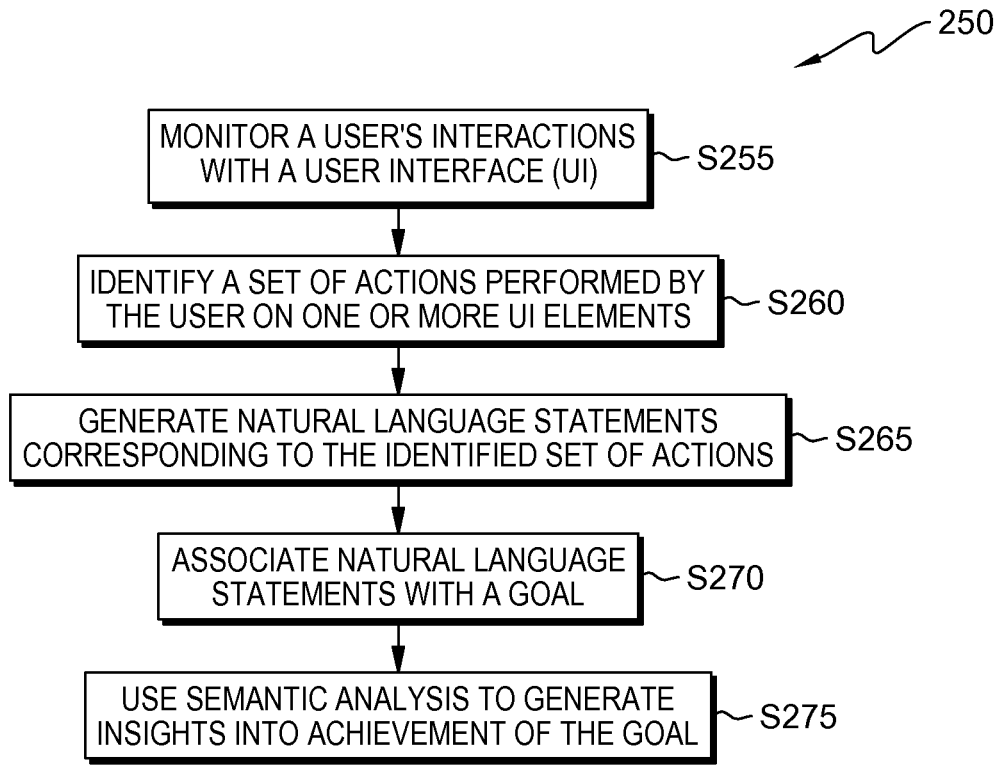
FIG. 2 is a flowchart showing a first embodiment method performed, at least in part, by the first embodiment system.
Figure 3:
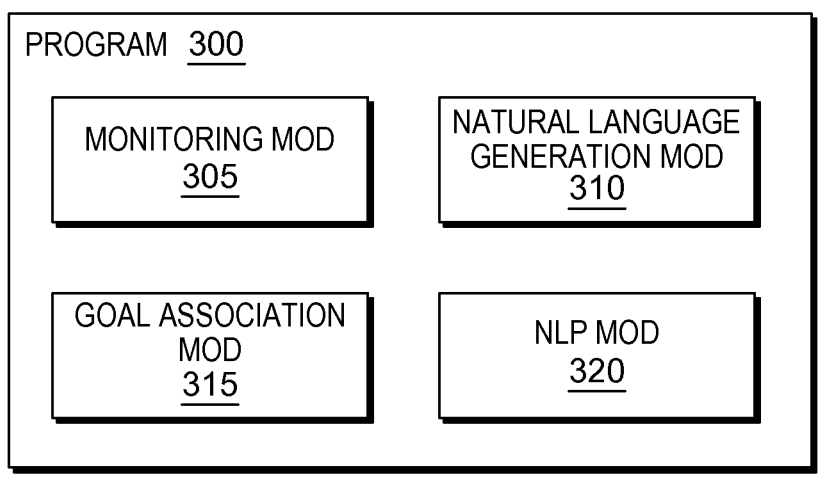
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks). It should be noted that this example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section. Furthermore, although program 300 is shown in FIG. 1 as being located in persistent storage 210 of UI monitoring computer 200 of UI monitoring sub-system 102, it should be recognized that in certain embodiments, some or all of program 300 may reside in other locations, such as in sub-systems 104, 106, 108, 110, and/or 112 of networked computers system 100.

Generally speaking, a purpose of the method depicted in flowchart 250 is to develop insight from a user's interactions with a user interface. In many embodiments, the insight developed from these interactions is used by user interface designers to improve and/or enhance existing user interfaces. However, this is not meant to be limiting, and the insights, goals, and natural language statements discussed herein may be used for a wide variety of known (or yet to be known) purposes, some of which will be discussed in more detail in the Further Comments and/or Embodiments sub-section of this Detailed Description.

Processing begins at operation S255, where monitoring module ("mod") 305 monitors a user's interactions with a user interface (UI). In the present example embodiment, the UI includes display 212 (which UI monitoring computer 200 uses to display information to the user) and a computer mouse (which is a subset of external devices 214 of UI monitoring computer 200, and is used by the user to communicate information back to the computer). However, this is not meant to be limiting, and wide variety of other known (or yet to be known) UI devices may be used, including, for example: (i) output devices such as displays, speakers, projectors (including holographic projectors), and tactile simulators; (ii) input devices such as mice, keyboards, cameras, and motion sensors; and/or (iii) input/output devices such as touchscreens, smartphones, and telephones.

User interfaces may include one or more user interface (UI) elements. Given the wide variety of possible UI devices that may be used, a wide variety of corresponding UI elements may also be used. In some embodiments (including the present example embodiment), UI elements include graphical items displayed on a display (such as display 212), some examples of which include, but are not limited to: buttons, boxes, lists, toggles, date pickers, time pickers, windows, text fields, sliders, images, videos, modal pop-ups, accordians, menus, backgrounds, and the like. This is certainly not meant to be limiting, however, and UI elements according to the present invention may include any known (or yet to be known) element within a user interface that is capable of being interacted with by a user of the user interface.

Figure 4A:
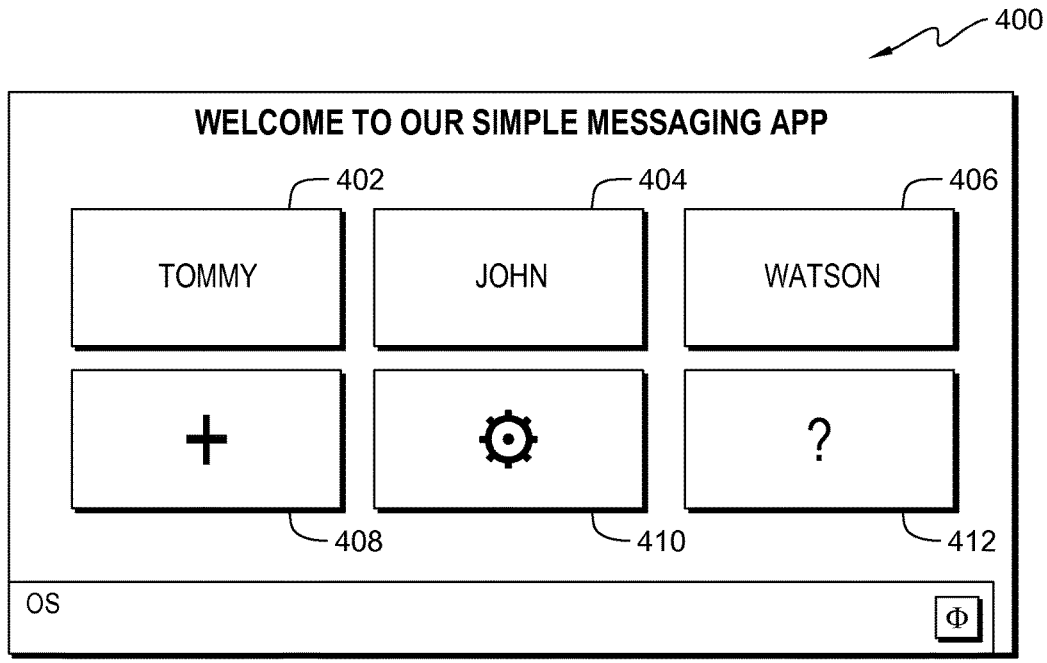
FIG. 4A is a screenshot view generated by the first embodiment system.

In the present embodiment, the user's interactions with the UI are centered around a specific computer application (or "app"). In this example embodiment, the app is a simple messaging app which allows the user to send messages to his "contacts" via a single click of a button. Screenshot 400 (see FIG. 4A) depicts an example of the UI for this app. As shown in FIG. 4A, the UI in the present example includes the following on-screen UI elements: button 402 (representing a contact nicknamed "Tommy"); button 404 (representing a contact nicknamed "John"); button 406 (representing a contact nicknamed "Watson"); button 408 (showing a plus sign); button 410 (showing a "gear" icon), and button 412 (showing a question mark). Buttons 402, 404, and 406, when clicked, send a predetermined message (for example, "Hi," "What's up?" or "How are you doing?") to their respective contacts; that is, button 402 sends a message to Tommy, button 404 sends a message to John, and button 406 sends a message to Watson. Button 408, when clicked, takes the user to a screen for adding new contact buttons, button 410, when clicked, takes the user to a settings page, and button 412, when clicked, takes the user to a help page.

Processing proceeds to operation S260, where monitoring mod 305 identifies a set of actions performed by the user using one or more UI elements. The actions may be any actions performable by the user on one or more of the UI elements. For example, in some embodiments (including the present example embodiment), an action may be simply "clicking" on a UI element. In other (or the same) embodiments, an action may be "selecting" (using, for example, a drag select feature) a group of UI elements. Some other examples of actions include, but are certainly not limited to: a left click, a right click, a middle click, a scroll action (using, for example, a scrollwheel), a trackpad gesture, a quick tap, a long tap, a double click, a double tap, a quick hover, a long hover, a verbal indication of a selection, a hand gesture, a facial gesture, and a body gesture.

In the present example embodiment, monitoring mod 305 identifies the following actions performed by the user: (i) the user double clicks on an application icon to open the messaging app; (ii) the user single left clicks button 410; (iii) the user single left clicks a "back" button (not shown); (iv) the user single left clicks button 412; (v) the user single left clicks another "back" button (not shown); and (vi) the user single left clicks button 402. Stated more generally, monitoring mod 305 observes the user clicking various buttons within the app before ultimately clicking the button to message the user's contact named "Tommy".

Processing proceeds to operation S265, where natural language generation mod 310 generates natural language statements corresponding to the identified set of actions. The natural language statements includes natural language text, and as such are generally analyzable by cognitive systems capable of natural language processing. The natural language statements generated by natural language generation mod 310 during operation S265 may include a wide variety of potential information relating to the identified actions. For example, in some embodiments, the generated natural language statements include information pertaining to the time at which one or more of the actions were performed (indicated, for example, by a timestamp). Some other examples of information that may be included in the generated natural language statements include, but are not limited to: identification of related UI element(s), information pertaining to the results (or intended results) of the performed actions, common synonyms of or alternative ways of describing the performed actions, and other information helpful in describing the user's interactions with the UI elements of the UI.

Figure 4B:
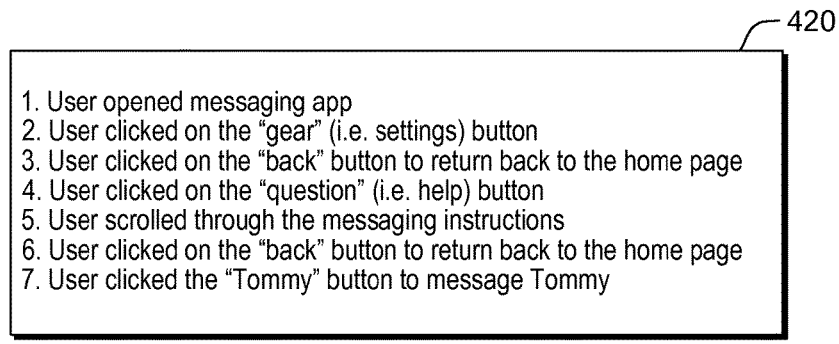
FIG. 4B is a diagram showing natural language statements generated by the first embodiment system.

Diagram 420 (see FIG. 4B) depicts an example of natural language statements generated by natural language generation mod 310 based on the previously discussed actions performed by the user. As shown in FIG. 4B, the user action of "the user double clicks on an application icon to open the messaging app" has been used by mod 310 to generate the following natural language statement: "User opened messaging app." As another example, the user action of "the user clicks (single left) button 402" has been used by mod 310 to generate the statement: "User clicked the 'Tommy' button to message Tommy." Although the remaining natural language statements in diagram 420 need not be recited here in their entirety, a general summary of the statements is that they describe the user's actions in a more natural way than they would have been if mod 310 had simply recorded the technical details of each action.

Processing proceeds to operation S270, where goal association mod 315 associates the natural language statements with a goal. A goal is an outcome that the user may achieve by performing the actions corresponding to the natural language statements. In some cases, the goal is an outcome that the user intends to achieve. In other cases, the goal is an outcome that the developer(s) (or administrator(s)) of the app intend for the user to achieve. As such, many goals are predefined and available for association by mod 315 at the time of processing operation S270. However, in some embodiments, additional goals may be determined during the natural language processing of step S260. For example, in the present example embodiment, the natural language statements are associated with the goal of "message Tommy," a goal which was generated during the natural language processing of step S260 based on the user's selected actions.

Processing proceeds to operation S275, where natural language processing (NLP) mod 320 uses semantic analysis to develop insights into achievement of the goal. Generally speaking, the insights include information—determined using natural language processing (and, more specifically, semantic analysis) on the generated natural language statements and their respectively associated goal—relating to how the user used the user interface and its elements to achieve the goal. Some general examples of insights that may be generated include, but are not limited to: (i) how long a user took to get to a particular goal; (ii) how many attempts it took for a user to reach a goal using a particular UI element; (iii) gaps and/or discrepancies in expected user action patterns; and/or (iv) whether a UI element (or set of UI elements) is used differently than anticipated. As should be readily apparent to one skilled in the art, the insights generated during this operation may be helpful to a user interface designer or a person responsible for improving user experiences associated with the user interface. For additional discussion of the generated insights (and the semantic analysis used to generate them), see the Further Comments and/or Embodiments sub-section of this Detailed Description.

In the present embodiment, some examples of insights developed based on the generated natural language statements and the goal of "message Tommy" include: (i) the user performed a number of actions before messaging Tommy; (ii) the user needed to visit the help page in order to determine how to message Tommy; and (iii) the user did not intuitively understand how to message Tommy when first interacting with the app's user interface. These insights may be helpful to, for example, a user interface designer for the app, indicating that additional UI elements or indicators may be helpful in better communicating the functionality of the app to new users.

Figure 4C:
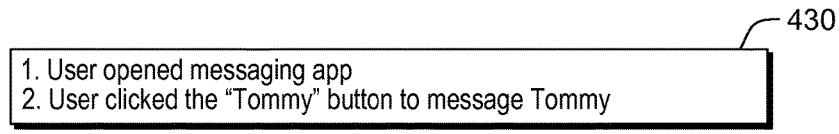
FIG. 4C is a diagram showing natural language statements generated by the first embodiment system.

In certain embodiments of the present invention, the actions of additional users may be monitored in order to develop additional insight into the achievement of the goal. In these embodiments, operations S265 through S270 may be used to generate additional natural language statements that then may, for example, be compared to the originally generated natural language statements for further analysis and insight. Diagram 430 (see FIG. 4C) depicts an example of additional natural language statements generated based on a second user's actions according to the present example embodiment. As shown in diagram 430, the natural language statements for achieving the goal of "message Tommy" (as "Tommy" is also a contact of the second user) describe only two actions (opening the app and clicking on the "Tommy" button, button 402). These natural language statements are used to develop additional insights into the achievement of the goal, including, for example, that the second user was able to quickly determine how to message Tommy, without relying on the "help" or "settings" sections of the app.

Referring still to the present example, in certain cases, the natural language statements generated for the first user's actions and the natural language statements generated for the second user's actions may be used to determine a minimal set of actions for achieving the goal. That is, by observing both sets of natural language statements, NLP mod 320 can determine that the goal of "message Tommy" can be achieved by simply opening the app and clicking on Tommy's name. This information can prove helpful for task automation and/or question answering sub-systems, for example, both of which are discussed below in the Further Comments and/or Embodiments sub-section of this Detailed Description.

III. Further Comments and/or Embodiments

Some embodiments of the present invention recognize the following facts, potential problems and/or potential areas for improvement with respect to the current state of the art: (i) existing event trackers (that is, computer programs that track events that occur within a user interface) do not produce output in natural language; and/or (ii) existing event tracker output (for example, in JSON format) is not easily ingestible by cognitive systems.

Some embodiments of the present invention may include one, or more, of the following features, characteristics and/or advantages: (i) better correlating user activity (for example, in the realm of input methods on devices) to particular goals; (ii) tracking and analyzing user activity as it relates to particular goals; (iii) providing business insight into how a user interacts with an application.

Some embodiments of the present invention track actions performed by a user of an application by mapping user interface (UI) items (represented, for example, by "ID(s)") and associated user actions with overarching goals (or "tasks"). In some of these embodiments, each UI item (also sometimes referred to as a "UI element", "graphical item", or "widget") in the application includes: (i) an ID; (ii) a set of actions performable on the graphical item; and (iii) a set of user inputs that can be used to trigger one or more of the set of actions. When a user uses a user input to trigger one or more actions, the user input, the action(s), a timestamp, and the ID for the corresponding graphical item are logged in natural language and associated with a particular goal (or set of goals). This association of actions and goals can be used to provide insight into the user's interaction with the application.

In certain embodiments, insights developed by the association of actions and goals can be aggregated across multiple users attempting the same task or goal. By aggregating actions and goals performed by multiple users, embodiments of the present invention can determine the best usability of a particular widget in the context of a certain goal.

Some embodiments of the present invention include a system and method for providing conversation analytics from natural language in an application. In these embodiments, the system may produce natural language statements containing an action, a goal, and an association with a UI item (such as a widget). The system may also perform semantic analysis across a set of the natural language statements associated with a particular goal, determine a set of actions performed on a set of widgets applicable for the goal, and produce insights of actions performed on the set of widgets for the particular goal.

In some example embodiments, the performed semantic analysis includes: (i) finding a verb action in a natural language statement; (ii) aggregating a set of similar actions on the same widget for a goal; (iii) determining the set of actions that were required to achieve the goal; and (iv) normalizing the set of actions across the aggregate for the goal to produce a minimal set of actions required to achieve the goal. In other (or the same) example embodiments, the performed semantic analysis includes (i) determining a tuple including an action, an object (or subject) of the action, and a widget; (ii) determining the number of times the tuple occurs for different users; and (iii) correlating the duration of the set of actions taken to accomplish the goal by averaging the amount of time taken to complete each set of actions.

In an embodiment of the present invention, each graphical element in an application's user interface includes an associated ID (referred to as a "gui-id"). For each activity performed using the user interface, a gesture, an action, and a task completed using a graphical element are logged. The grouping of information and interaction across a group of graphical elements generates a natural language statement. By generating natural language statements, the system can then use natural language based processing techniques to perform deep semantic analysis and learning on an application. Diagram 500 (See FIG. 5) depicts an example of a natural language log according to this embodiment. As shown in FIG. 5, diagram 500 includes a log of goals, corresponding actions, and natural language text accompanying each action and goal (including, for example, the gui-id for the graphical element used to perform each action/goal).

Some embodiments of the present invention may include one, or more, of the following features, characteristics and/or advantages: (i) producing natural language statements for user interactions with a user interface; (ii) capturing metadata (including timestamp, widget id, interaction coordinated, host application, etc.) for user interactions with a user interface; (iii) utilizing string templates to produce natural language statements for user interactions with a user interface; (iv) aggregating sets of natural language actions across a user session; (v) identifying one or more end goals from a session's natural language actions; (vi) associating each natural language action with one or more end goals; (vii) correlating user actions and goals with contextual metadata (such as geolocation, calendar events, sensor data, etc.); and/or (viii) aggregating goals and associated natural language actions and contextual metadata across a set of users.

The natural language statements produced by embodiments of the present invention may be utilized in a wide variety of ways. For example, in some embodiments, the natural language statements are used as natural language questions in a question answering (QA) system (see the Definitions sub-section, below), where the produced natural language questions indicate a goal to be accomplished and the system responds with the required steps to complete the goal. In other embodiments, the natural language statements may be used in task automation, where a goal is invoked from the natural language statements and used to automatically invoke the goal's pre-requisite actions relative to a device's current state. In still other embodiments, the natural language statements may be used to measure and/or optimize the efficiency of each user action based on the action's duration, required physical interaction, and frequency. And in still other embodiments, the natural language statements may be used to measure and/or optimize the efficiency of goal accomplishment based on the cumulative efficiency of the goal's associated actions.

In some embodiments, QA systems answer questions pertaining to a goal by utilizing the natural language statements. For example, in certain embodiments, the natural language statements may be compared to a corpora of documents relating to the goal (for example, documentation or instructions that the QA system would normally use to answer the question pertaining to the goal). An amount of difference between the natural language statements and the documents (or, actions extracted from the documents) may be measured, and, if the amount of difference exceeds a predetermined threshold, the received natural language question may be used to answer the question instead of the documentation. Or, stated another way, when asked questions about achieving a goal, instead of using preexisting instructions, QA systems of these embodiments use generated natural language statements to provide alternative sets of actions (or instructions) for achieving the goal. In other embodiments involving QA systems, an amount of similarity between the natural language statements and the received natural language question may be determined. In these embodiments, if natural language statements are determined to be similar to the received question (based on, for example, question context and lexical answer type), the statements may be used as a corpus for answering the question by the QA system. It should be noted that these examples, although demonstrative of the various ways in which the natural language statements may be used by a QA system, are not meant to be limiting, and that the natural language statements and their associated goals may be utilized in a wide variety of known (and yet to be known) ways.

Diagram 6 (see FIG. 6) depicts another example of a natural language log according to embodiments of the present invention. In this example, a user has taken actions to access email on her mobile phone, and the resulting natural language statements produced from those actions are shown in diagram 600. Upon generation of the natural language statements depicted in FIG. 6, the system then identifies any goals associated with the actions. Specifically, in this example, the system identifies the following two goals (with their associated actions): GOAL 1: "User unlocked phone" (actions 1 through 5); and GOAL 2: "User checked latest email" (GOAL 1 plus actions 6 through 9). As a result, the system knows the actions required to perform the goals of unlocking the phone and checking the latest email.

Referring still to FIG. 6, in this example, the system includes a task automation feature which automatically performs actions based on learned patterns of behavior. In many embodiments, the task automation feature utilizes I/O device(s) (such as external devices 214 and/or a microphone on the previously mentioned mobile phone) to receive input from a user. For example, if a user states (for example, requests) "open my latest email," the mobile phone will automatically correlate the statement to an end goal of "Open latest email." The phone will then retrieve associated pre-requisite steps/goals and invoke those steps/goals relative to the system's current state (for example, if the phone is already unlocked, it will bypass the pre-requisite goal of "unlock phone"). In this case, the phone will prompt the user for a passcode, move (or "swipe") to the home screen page with the user's email application, open the email application, refresh the email application's inbox, and access the first email item in the inbox.

In an embodiment of the present invention, a system collects user actions performed using UI elements. The actions are collected in a particular order that form a story (that is, a set of actions that achieve a goal). In many situations, the order in which the actions are collected is the same as the order in which the user performed the actions. However, this is not always the case. In some situations, the order in which the user performed the actions may be different from the order of the actions in a particular story. Additionally, in some situations, the user may get diverted—performing non-story actions—before finally completing all of the actions associated with a story. In many cases, the actions are then passed to a template engine which includes a set of natural language templates associated with each UI element. The templates corresponding to the UI elements used to perform the collected actions are then populated with various parameters based on the collected actions, resulting in a set of natural language statements associated with each UI element (and ultimately, the goal). These natural language statements, along with their corresponding timestamps, are then used to build insights related to a particular widget, action (or "task"), or goal. Some examples of these insights include, but are not limited to: (i) how long the user took to get to an expected task or goal; and/or (ii) how many attempts per goal a user made using a particular widget. The insights can then be aggregated across multiple users attempting the same task or goal to associate the best usability of a particular widget in the context of the goal.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Automatically: without any human intervention.

Module/Sub-Module: any set of hardware, firmware and/or software that operatively works to do some kind of function, without regard to whether the module is: (i) in a single local proximity; (ii) distributed over a wide area; (iii)

in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Natural Language: any language used by human beings to communicate with each other.

Natural Language Processing: any derivation of meaning from natural language performed by a computer.

Question Answering System: any computer system that answers questions posed in natural language.

What is claimed is:

1. A method comprising:
   identifying, by one or more processors, a first set of actions performed by a first user using a user interface (UI), wherein each action of the first set of actions corresponds to a respective UI element;
   generating, by one or more processors, a set of natural language statements corresponding to the identified first set of actions;
   associating, by one or more processors, natural language statements of the set with a goal, wherein the goal is achievable by performing actions of the first set of actions using their respectively corresponding UI elements;
   identifying, by one or more processors, at least a second set of actions performed by a second user using the UI, wherein each action of the second set of actions corresponds to a respective UI element;
   generating, by one or more processors, a set of second natural language statements corresponding to the identified second set of actions;
   associating, by one or more processors, second natural language statements of the set with the goal;
   correlating, by one or more processors, a duration of the first set of actions and the second set of actions by averaging respective amounts of time taken to complete the first set of actions and the second set of actions; and
   determining, by one or more processors, an optimized set of actions for achieving the goal, wherein the optimized set of actions includes actions from at least one of the first set of actions or the second set of actions, and wherein the actions of the optimized set of actions are optimized based on the correlated duration.

2. The method of claim 1, further comprising:
   receiving, by one or more processors, a request to achieve the goal; and
   performing, by one or more processors, the actions of the optimized set of actions using their respectively corresponding UI elements.

3. The method of claim 1, further comprising:
   answering, by one or more processors, a received natural language question pertaining to the goal using the associated natural language statements.

4. The method of claim 3, wherein answering the received natural language question pertaining to the goal using the associated natural language statements comprises:
   comparing, by one or more processors, the natural language statements to documentation relating to the goal;
   determining, by one or more processors, an amount of difference between the natural language statements and the documentation; and
   responsive to determining that the amount of difference exceeds a predetermined threshold, answering, by one or more processors, the received natural language question pertaining to the goal using the natural language statements.

5. The method of claim 3, wherein answering the received natural language question pertaining to the goal using the associated natural language statements comprises:
   determining, by one or more processors, an amount of similarity between the natural language statements and the received natural language question, wherein the amount of similarity is based, at least in part, on the question's context and lexical answer type; and
   responsive to determining that the amount of similarity exceeds a predetermined threshold, utilizing, by one or more processors, the natural language statements as a corpus for answering the received natural language question.

6. The method of claim 1, wherein the generated set of natural language statements and the generated set of second natural language statements include information pertaining to times at which one or more action(s) of the first set of actions and one or more action(s) of the second set of actions were respectively performed.

7. A computer program product comprising a computer readable storage medium having stored thereon:
   instructions executable by a device to cause the device to identify a first set of actions performed by a first user using a user interface (UI), wherein each action of the first set of actions corresponds to a respective UI element;
   instructions executable by the device to cause the device to generate a set of natural language statements corresponding to the identified first set of actions;
   instructions executable by the device to cause the device to associate natural language statements of the set with a goal, wherein the goal is achievable by performing actions of the first set of actions using their respectively corresponding UI elements;
   instructions executable by the device to cause the device to identify at least a second set of actions performed by a second user using the UI, wherein each action of the second set of actions corresponds to a respective UI element;
   instructions executable by the device to cause the device to generate a set of second natural language statements corresponding to the identified second set of actions;
   instructions executable by the device to cause the device to associate second natural language statements of the set with the goal;
   instructions executable by the device to cause the device to correlate a duration of the first set of actions and the second set of actions by averaging respective amounts of time taken to complete the first set of actions and the second set of actions; and
   instructions executable by the device to cause the device to determine an optimized set of actions for achieving the goal, wherein the optimized set of actions includes actions from at least one of the first set of actions or the second set of actions, and wherein the actions of the optimized set of actions are optimized based on the correlated duration.

8. The computer program product of claim 7, further comprising:

instructions executable by the device to cause the device to receive a request to achieve the goal; and instructions executable by the device to cause the device to perform the actions of the optimized set of actions using their respectively corresponding UI elements.

9. The computer program product of claim 7, further comprising:

instructions executable by the device to cause the device to answer a received natural language question pertaining to the goal using the associated natural language statements.

10. The computer program product of claim 9, wherein answering the received natural language question pertaining to the goal using the associated natural language statements comprises:

comparing the natural language statements to documentation relating to the goal;

determining an amount of difference between the natural language statements and the documentation; and responsive to determining that the amount of difference exceeds a predetermined threshold, answering the received natural language question pertaining to the goal using the natural language statements.

11. The computer program product of claim 9, wherein answering the received natural language question pertaining to the goal using the associated natural language statements comprises:

determining an amount of similarity between the natural language statements and the received natural language question, wherein the amount of similarity is based, at least in part, on the question's context and lexical answer type; and responsive to determining that the amount of similarity exceeds a predetermined threshold, utilizing the natural language statements as a corpus for answering the received natural language question.

12. The computer program product of claim 7, wherein the generated set of natural language statements and the generated set of second natural language statements include information pertaining to times at which one or more action(s) of the first set of actions and one or more action(s) of the second set of actions were respectively performed.

13. A computer system comprising:
a processor(s) set; and
a computer readable storage medium;
wherein:
the processor set is structured, located, connected and/or programmed to execute instructions stored on the computer readable storage medium; and
the instructions include:
instructions executable by a device to cause the device to identify a first set of actions performed by a first user using a user interface (UI), wherein each action of the first set of actions corresponds to a respective UI element;
instructions executable by the device to cause the device to generate a set of natural language statements corresponding to the identified first set of actions;
instructions executable by the device to cause the device to associate natural language statements of the set with a goal, wherein the goal is achievable by performing actions of the first set of actions using their respectively corresponding UI elements;

instructions executable by the device to cause the device to identify at least a second set of actions performed by a second user using the UI, wherein each action of the second set of actions corresponds to a respective UI element;

instructions executable by the device to cause the device to generate a set of second natural language statements corresponding to the identified second set of actions;

instructions executable by the device to cause the device to associate second natural language statements of the set with the goal;

instructions executable by the device to cause the device to correlate a duration of the first set of actions and the second set of actions by averaging respective amounts of time taken to complete the first set of actions and the second set of actions; and instructions executable by the device to cause the device to determine an optimized set of actions for achieving the goal, wherein the optimized set of actions includes actions from at least one of the first set of actions or the second set of actions, and wherein the actions of the optimized set of actions are optimized based on the correlated duration.

14. The computer system of claim 13, further comprising:
instructions executable by the device to cause the device to receive a request to achieve the goal; and
instructions executable by the device to cause the device to perform the actions of the optimized set of actions using their respectively corresponding UI elements.

15. The computer system of claim 13, further comprising:
instructions executable by the processor set to cause the system to answer a received natural language question pertaining to the goal using the associated natural language statements.

16. The computer system of claim 15, wherein answering the received natural language question pertaining to the goal using the associated natural language statements comprises:

comparing the natural language statements to documentation relating to the goal;

determining an amount of difference between the natural language statements and the documentation; and responsive to determining that the amount of difference exceeds a predetermined threshold, answering the received natural language question pertaining to the goal using the natural language statements.

17. The computer system of claim 15, wherein answering the received natural language question pertaining to the goal using the associated natural language statements comprises:

determining an amount of similarity between the natural language statements and the received natural language question, wherein the amount of similarity is based, at least in part, on the question's context and lexical answer type; and responsive to determining that the amount of similarity exceeds a predetermined threshold, utilizing the natural language statements as a corpus for answering the received natural language question.

18. The computer system of claim 13, wherein the generated set of natural language statements and the generated set of second natural language statements include information pertaining to times at which one or more action(s) of the first set of actions and one or more action(s) of the second set of actions were respectively performed.

* * * * *